United States Patent [19] [11] Patent Number: 6,096,453
Grunwald [45] Date of Patent: Aug. 1, 2000

[54] POLYMERIC THIN-FILM REVERSIBLE ELECTROCHEMICAL CHARGE STORAGE DEVICES

[75] Inventor: Yaron Grunwald, San Jose, Calif.

[73] Assignee: Adven Polymers, Inc., San Jose, Calif.

[21] Appl. No.: 09/100,203

[22] Filed: Jun. 19, 1998

[51] Int. Cl.[7] .................................................. H01M 4/60
[52] U.S. Cl. .......................................... 429/212; 429/213
[58] Field of Search .................................. 429/212, 213, 429/303

[56] References Cited

U.S. PATENT DOCUMENTS

| | | | |
|---|---|---|---|
| 4,321,114 | 3/1982 | MacDiarmid et al. | 429/213 X |
| 4,681,822 | 7/1987 | Berthier et al. | |
| 4,983,322 | 1/1991 | Elsenbaumer | 250/500 |
| 5,166,008 | 11/1992 | Tamura et al. | |
| 5,362,493 | 11/1994 | Skotheim et al. | |
| 5,424,151 | 6/1995 | Koksbang et al. | 429/213 |
| 5,451,476 | 9/1995 | Josefowicz | 429/213 |
| 5,460,905 | 10/1995 | Skotheim | 429/213 |
| 5,637,421 | 6/1997 | Poehler et al. | |
| 5,667,913 | 9/1997 | Chen et al. | |
| 5,682,043 | 10/1997 | Pei et al. | 257/40 |
| 5,773,166 | 6/1998 | Matsui et al. | 429/212 |
| 5,917,693 | 6/1999 | Kono et al. | 429/212 |

FOREIGN PATENT DOCUMENTS

| | | | |
|---|---|---|---|
| 5-166511 | 7/1993 | Japan | H01M 4/60 |
| 98/05085 | 2/1998 | WIPO | H01M 10/44 |

OTHER PUBLICATIONS

Patent Abstracts of Japan, vol. 017, No. 566 (E–1446), Oct. 13, 1993 (For JP–5–166511).

Patent Abstracts of Japan, vol. 012, No. 423 (E–680), Nov. 9, 1988 (For JP–63–160154).

Patent Abstracts of Japan, vol. 009, No. 284 (E–357), Nov. 12, 1985 (For JP–60–127663).

Arbizzani et al., "Electrochemical Characterization of a Polymer/Polymer Rechargeable Lithium Solid–State Cell", *Synthetic Metals*, 28(1989), pp. C663–C668 (Month Unknown).

Schoch, et al., "Conducting Polymers", *IEEE Spectrum*, Jun. 1992, pp. 52–55.

Bockris et al., "The Electrochemistry of Electronically Conducting Polymers", *Conducting Polymers: Special Applications*, Proceedings of the Workshop held at Sintra, Portugal, Jul. 28–31, 1986.

(List continued on next page.)

*Primary Examiner*—Stephen Kalafut
*Attorney, Agent, or Firm*—Beyer Weaver & Thomas LLP

[57] ABSTRACT

An electrochemical energy storage device is described. The electrochemical energy storage device includes: (1) a polymer electrode having (A) an organic conjugated compound; and (B) an ionically conductive polymer electrolyte, wherein the organic conjugated compound and the ionically conductive polymer electrolyte form a bicontinuous interpenetrating network, in which the organic conjugated compound and the ionically conductive polymer electrolyte form distinct continuous phases and an average phase size of the organic conjugated compound in the bicontinuous interpenetrating network is in the order of nanometers; and (2) a separator that is electronically non-conductive and contacts the polymer electrode such that the separator facilitates the transport of ions to and from the polymer electrode. Another electrochemical energy storage device is also described. This electrochemical energy storage device includes a surfactant in the polymer electrode to form a bicontinuous interpenetrating network of nanometer scale phase size. Yet another electrochemical energy storage device is also described. This electrochemical energy storage device includes a conjugated compound having a side-chain that has an affinity to a polymer electrolyte and as a result, the conjugated compound and polymer electrolyte form a more compact bicontinuous interpenetrating network.

51 Claims, 2 Drawing Sheets

OTHER PUBLICATIONS

Pei, et al. "Polymer Light–Emitting Electrochemical Cells", *Science*, vol. 269, Aug. 25, 1995, pp. 1086–1088.

Yu, et al., "Measurement of the energy gap in semiconducting polymers using the light–emitting electrochemical cell", *Chemical Physics Letters* 259 Sep. 6, 1996, pp. 465–468.

Echigo, et al., "Ion Rechargeable Batteries Using Synthetic Organic Polymers", *Synthetic Metals*, 55–57 (1993) pp. 3611–3616 (Month Unknown).

B. E. Conway, "Transition from 'Supercapacitor' to 'Battery' Behavior in Electrochemical Energy Storage", Jun. 1991, *J. Electrochem. Soc.*, vol. 138, No. 6, pp. 1539–1548.

Bohnke, et al., "Gel Electrolyte for Solid–State Electochromic Cell", Jul. 1992, *J. Electrochem. Soc.*, vol. 139, No. 7, pp. 1862–1865.

Karasz et al., "Electrically Conductive Polymers: Newer Applications", *Macromolecular Design of Polymeric Materials*, Chapter 32, pp. 561–571 1997, Month Unknown.

Okamoto et al., "Ionically Conductive Polymers", *Macromolecular Design of Polymeric Materials*, Chapter 33, pp. 573–586 1997, Month Unknown.

Lee, et al., "Ionic Conductivity of a Polymer Electrolyte with Modified Carbonate as a Plasticizer for Poly(ethylene oxide)" Apr. 1994, *J. Electrochem. Soc.*, vol. 141, No. 4, pp. 886–889.

Matsumoto, et al., "Ionic Conductivity of Dual–Phase Polymer Electrolytes Comprised of NBR/SBR Latex Films Swollen with Lithium Salt Solutions", Aug. 1994, *J. Electrochem. Soc.*, vol. 141, No. 8, pp. 1989–1993.

Pei, et al., "Efficient Photluminescence and Electroluminescence from a Soluble Polyflourene", May 1996, *J. Am. Chem. Soc.* 118, (1996) pp. 7416–7417.

Greenwald, et al. "Cyclic Voltammetry Studies of Light–Emitting Electrochemical Cells", Apr. 1997, *J. Electrochem. Soc.*, vol. 144, No. 4, pp. L70–L72.

Hide, et al., "Semiconducting Polymers: A New Class of Solid–State Laser Materials", Sep. 27, 1996, *Science*, vol. 273, pp. 1833–1836.

Greenwald, et al., "The Electrochemistry of Poly(3–octylthiophene) Based Light–Emiting Electrochemical Cells", Sep. 1997, *J. Electrochem. Soc.*, vol. 144, No. 9, pp. L241–L243.

Pei, et al., "Polymer Light–Emitting Electrochemical Cells: In Situ Formation of a Light–Emitting p–n Junction", *J. Am. Chem. Soc.* 1996, 118, pp. 3922–3929 (Month Unknown).

Hide et al., "New Developments in the Photonic Applications of Conjugated Polymers", *Accounts of Chemical Research*, vol. 30, No. 10, 1997, pp. 430–436 (Month Unknown).

Osaka, et al., "Application of Solid Polymer Electrolyte to Lithium/Polypyrrole Secondary Battery System", Aug. 1994, *J. Electrochem. Soc.*, vol. 141, No. 8, pp. 1994–1998.

Killian, et al., "Polypyrrole Composite Electrodes in an All–Polymer Battery System", Mar. 1996, *J. Electrochem. Soc.*, vol. 143, No. 3, pp. 936–942.

Child, et al., Water–Soluble Rigid–Rod Polyelectrolytes: A New Self–Doped, Electroactive Sulfonatoalkoxy–Substituted Poly (p–phenylene), *Macromolecules*, vol. 27, No. 7, 1994, pp. 1975–1977 (Month Unknown).

Bruno Scrosati, "Electrode and Electrolyte Materials for Polymer–Based Lithium Batteries", Oct. 1989, *J. Electrochem. Soc.*, vol. 136, No. 10, pp. 2774–2782.

Nagasubramanian, et al., "Effects of 12–Crown–4–Ether on the Electrochemical Performance of $CoO_2$ an $TiS_2$ Cathodes in Li Polymer Electrolyte Cells", Nov. 1992, *J. Electrochem. Soc.*, vol. 139, No. 11, pp. 3043–3045.

Nekoomanesh, et al., "The Effect of Oxyethylene Sequence Length on the Properties of Poly[oxymethylene–oligo(oxyethylene)]/$LiClO_4$ Polymer Electrolytes", Nov. 1992, *J. Electrochem. Soc.*, vol. 139, No. 11, pp. 3046–3051.

Tada, et al., "Photocross–Linked Solid Polymer Electrolyte", Jul. 1988, *J. Electrochem. Soc.*, vol. 135, No. 7, pp. 1728–1729.

Kim, et al., "Electrochromic Window Based on Poly(aniline–N–butylsulfonate)s with a Radiation–Cured Solid Polymer Electrolyte Film" Jan. 1997, *J. Electrochem. Soc.*, vol. 144, No. 1, pp. 227–232.

Momma, et al., "Electrochemical Redox Properties of Polypyrrole/Nafion Composite Film in a Solid Polymer Electrolyte Battery", Jun. 1995, *J. Electrochem. Soc.*, vol. 142, No. 6, pp. 1766–1769.

Casalbore–Miceli, et al., "All–Solid–State Batteries Based on Conducting Polymers", *Synthetic Metals*, 41–43 (1991), pp. 1119–1122 (Month Unknown).

Arbizzani et al., "Polymer–Based Lithium Rechargeable Batteries. I. Poly N–(3,6–Dioxaheptyl) Pyrrole with $(PEO-SEO)_{20}$ $LiClO_4$" *Synthetic Metals*, 41–43 (1991), pp. 1147–1150 (Month Unknown).

John R. Reynolds, "Advances in the Chemistry of Conducting Organic Polymers: a Review", *Journal of Molecular Electronics*, vol. 2 (1986), pp. 1–21 (Month Unknown).

Fritz G. Will, "Charge–Discharge Behavior of Polyacetylene Electrodes" Oct. 1985, *J. Electrochem. Soc.*, vol. 132, No. 10, pp. 2351–2356.

Nakajima, et al., "Polyaniline: Structural Analysis and Application for Battery", *Synthetic Metals*, 28 (1989), pp. C629–C638 (Month Unknown).

Mizumoto et al., "Polyaniline As An Electrode Of Rechargeable Battery" *Synthetic Metals*, 28 (1989), pp. C639–C646 (Month Unknown).

Genies et al., "Secondary Organic Batteries Made With Thick Free Standing Films of Electrochemically Prepared Polyaniline", *Synthetic Metals*, 28 (1989), pp. C647–C654 (Month Unknown).

Shacklette et al., "High Energy Density Batteries Derived From Conductive Polymers", *Synthetic Metals*, 28 (1989), pp. C655–C662 (Month Unknown).

J. M. G. Cowie, "Conductivity in Non–Main Chain Oxide Systems and Some Linear Analogues", 1997, *Polymer Electrolyte Reviews–1*, Elsevier Applied Science, pp. 69–101 (Month Unknown).

H. Cheradame, "Ionically Conducting Polyether Networks", 1997, *Polymer Electrolyte Reviews–1*, Elsevier Applied Science, pp. 103–113 (Month Unknown).

F. M. Gray, "Mixed Polymer Systems", 1997 *Polymer Electrolyte Reviews–1*, Elsevier Applied Science, pp. 139–172 (Month Unknown).

Fiona M. Gray, *Solid Polymer Electrolytes Fundamentals and Technological Applications*, Chapter 6, "Polymer Electrolyte Architecture", 1991, pp. 95–123 (Month N/A).

Fiona M. Gray, *Solid Polymer Electrolytes Fundamentals and Technological Applications*, Chapter 7, "Further Developments in Polymer Electrolyte Materials" 1991, pp. 125–147 (Month N/A).

M. Andrei, L. Marchese, and A. Roggero, and S. Passerini and B. Scrosati, "Crosslinked Comb–Shaped Polymers Based on Ethylene Oxide Macromers", Second International Symposium on Polymer Electrolytes, Edited By B. Scrosati, 1990, pp. 107–117 (Month Unknown).

K. Such, Z. Florianczyk, W. Wieczorek, and J. Przyluski, "Polymer Solid Electrolytes Based On Poly(Ethylene Oxide)–Poly(Methyl Methacrylate) Blends and Ethylene Oxide Copolymers", Second International Symposium on Polymer Electrolytes, Edited By B. Scrosati, 1990, pp. 119–127 (Month Unknown).

O. Inganäs, X. Shuang, R.B. Bjorklund and P. Reinholdsson, "Polymer Electrodes and Polymer Electrloytes in Li Secondary Batteries", Second International Symposium on Polymer Electrolytes, Edited By B. Scrosati, 1990, pp. 383–394 (Month Unknown).

POLYMERIC THIN-FILM REVERSIBLE ELECTROCHEMICAL CHARGE STORAGE DEVICES

CROSS-REFERENCE TO RELATED APPLICATION

This application is related to U.S. patent application Ser. No. 09/100,678 and filed on Jun. 19, 1998, naming Yuron Grunwold as inventor and titled Process of Foaming Polymeric Thin-Film Reversible Electrochemical Charge Storage Devices.

BACKGROUND OF THE INVENTION

The present invention relates to electrochemical energy storage devices. More particularly, the present invention relates to electrochemical energy storage devices including at least one polymer electrode, which has a bicontinuous interpenetrating network of nanometer scale.

Electrochemical storage devices, such as batteries, can be classified into either primary or secondary batteries. Primary batteries are not designed to be recharged and are not reusable after they have been fully discharged. Secondary batteries, however, are rechargeable after they have been fully discharged. One example of a commercially widely available primary battery is an alkaline battery, which typically includes a zinc anode of large surface area, a manganese dioxide cathode of high density and a potassium hydroxide electrolyte. Alkaline batteries have a nominal voltage of 1.5 V and operate over a wide temperature range (approximately −20 to 70° C.). Furthermore, they are capable of withstanding and functioning under severe operating conditions, such as mechanical shock, high pressure and the like.

The demand for rechargeable or secondary batteries of high energy density and specific energy has, however, increased with the increasing demand for portable electronic equipment, e.g. cellular phones, laptop computers, consumer electronics, power tools, etc. In order to meet this demand, various types of rechargeable batteries have been developed including improved nickel-cadmium aqueous batteries, various formulations of aqueous nickel metal hydride batteries and non-aqueous rechargeable lithium batteries (hereinafter referred to as "Li-ion secondary batteries"). Nevertheless, all secondary battery chemistries are more expensive than primary battery chemistries. The Li-ion secondary battery chemistry is particularly expensive.

Nickel-cadmium aqueous batteries are the least expensive among the portable rechargeable battery chemistries mentioned above. A typical nickel-cadmium secondary battery (having a nominal voltage of about 1.2 V) includes a metallic cadmium sponge anode, a nickel hydrate ($Ni(OH)_3$) based cathode and an electrolyte, which may have an aqueous solution of potassium hydroxide (KOH). Some advantages of this chemistry include long life (with up to 1500 charge discharge cycles), capability of high discharge rate, and quick charge times, for example. Nickel-cadmium batteries are particularly attractive in applications where low battery cost is of paramount importance and that require high discharge rates, which are not provided by other chemistries. Unfortunately, the use of cadmium in the nickel-cadmium chemistry is a growing environmental concern.

Nickel metal hydride is a rapidly growing alternative secondary battery chemistry. The primary difference between the nickel-cadmium battery chemistry and nickel metal hydride battery chemistry is that in the nickel metal hydride chemistry, the active material in the cathode is a hydrogen absorbing metal alloy, which reversibly absorbs and releases hydrogen gas generated by the electrochemical discharge reaction. Upon absorption of hydrogen, the metal alloy becomes a metal hydride. The advantages of nickel metal hydride chemistry over nickel-cadmium chemistry are the provision of higher energy densities and lack of cadmium-related environmental problems, for example. Nickel metal hydride is, however, more expensive relative to the nickel-cadmium chemistry and less expensive relative to the Li-ion chemistry.

Among the commercially available portable rechargeable battery chemistries, Li-ion provides the highest energy densities. A typical Li-ion cell consists of a lithiated cobalt oxide, lithiated nickel oxide or lithiated manganese oxide based composite cathode, a carbon-based anode, and a lithium ion liquid electrolyte. Lithium is the lightest and is the most electropositive alkali metal (charge capacity 3.86 Ah/g). Furthermore, Li-ion batteries have a long cycle life, provide a high cell voltage and are capable of functioning at a wide temperature range. Unfortunately, Li-ion battery chemistry is the most expensive of the portable rechargeable battery chemistries and is inappropriate for applications requiring rapid discharge. Furthermore, during recharging of the Li-ion batteries, dendrite formation undesirably leads to shorts. Further still, Li-ion batteries are typically equipped with electronic circuits to monitor the discharge history and prevent overcharging. This protective circuitry adds to the cost of manufacturing a battery. Further still, it is expensive to produce the high quality porous electrodes that are employed in the Li-ion battery.

Lithium-polymer (Li-polymer) battery chemistry, which is a modification of the Li-ion battery chemistry, is another emerging secondary battery chemistries for portable electronics. Li-polymer chemistry is similar to the Li-ion chemistry, except that a polymer or gel electrolyte, e.g., a poly(vinylidene fluoride) (PVDF) electrolyte containing lithium salt, is used in place of a liquid electrolyte. Li-polymer chemistry is the chemistry of choice over Li-ion in portable electronic applications because the Li-polymer battery can be processed into a thin sheet whereas Li-ion batteries require a container for holding the liquid electrolyte. Thin sheet processability and deformability are ideal for portable electronic applications where space is at a premium. The elimination of the liquid electrolyte also improves safety characteristics over Li-ion cells, which use an inflammable liquid electrolyte. Unfortunately, the Li-polymer batteries also suffer from some of the same drawbacks as the Li-ion battery mentioned above, e.g., added costs of overcharge monitoring circuits and producing a high quality porous electrode, and dendrite formation.

In order to circumvent the dendrite formation in the Li-ion and Li-polymer battery mentioned above, Li-ion and Li-polymer battery chemistries typically employ Li insertion compounds instead of Li metal as the anode material. In this case, dendrite formation is avoided as long as the potential between the two electrodes never reaches $Li/Li^+$. Li insertion compounds are known to have open structures that are capable of accepting and releasing $Li^+$ ions. By way of example, one such lithium insertion compound for the anode is $Li_xC_6$, which has a charge capacity for x=0.5 of about 0.186 Ah/g and is well known in the art for accepting large quantities of lithium. Unfortunately, the performance of the cathode (e.g., lithiated cobalt oxide, lithiated nickel oxide or lithiated manganese oxide based composites) and anode materials is dependent on their morphology, which controls the ionic conductivity. Thus, in order to have a sufficiently high ionic conductivity in the presence of negligible bulk ionic diffusion, high quality porous electrodes are necessary. Consequently, even with the use of lithium insertion compounds, the drawbacks of significant costs associated with high quality porous electrodes and electronic circuitry for protection against overvoltage still persists.

The search for a commercially viable battery technology for portable electronic applications is knocking at the door of battery technology that employs a conductive polymer electrode and is still very much in its infancy. The conductive polymer typically include conjugated polymers, which are known like other polymers to undergo p-type doping with good reversibility. By way of example, typical upper limits for anion intercalation (p-type doping) of lower energy gap polymers (i.e. having an energy gap of approximately 2 eV) is about 0.25 electrons per repeat unit and of higher energy gap polymers (i.e. having an energy gap higher than approximately 3 eV) is about 0.3 to about 0.5 electrons per repeat unit. The typical upper limits for cation intercalation (n-type doping) are lower than the upper limits for anion intercalation mentioned above. Furthermore, the charge capacity of the conjugated polymers are lower than the corresponding theoretical values for Li metal and Li intercalation anodes mentioned above.

Bridgestone Lithium Polymer Button Cell (hereinafter referred to as "button cell"), available from Bridgestone Corporation of Tokyo, Japan, is one polymer electrode battery that is commercially available. It employs a LiAl (lithiated aluminum) anode, polyaniline cathode and a liquid electrolyte. It is a supercapacitor and therefore high charge capacity is not essential. The button cell, for example, has a nominal charge capactiy of about 4 mAh and is designed for >10$^3$ shallow cycles at 1 mAh.

Unfortunately, the Bridgestone button cell fails to meet the power demands of most portable electronic equipment. The button cell is employed in a limited role as an electrical buffer in electronic circuitry. By way of example, in solar cells the button cell may function as a support cell when the main cell for energizing the circuit is inactive. In other words, the button cell fails to fully exploit the advantages of polymer-based systems to increase the energy density of the battery, which would make it suitable for portable electronic equipment applications.

Furthermore, the button cell has a polymer electrode that is made from electrochemically synthesized polyaniline, which is undesirable for large scale fabrication of electrodes. Further still, polyaniline film produced electrochemically is brittle and tends to break when subject to external force. Consequently, polyaniline electrode fails to lend itself to thin film processability.

What is therefore needed is a lower cost battery chemistry that has performance comparable to commercially available chemistries and offers thin sheet processability and deformability.

SUMMARY OF THE INVENTION

To achieve the foregoing, in one aspect, the present invention provides an electrochemical energy storage device. The electrochemical energy storage device includes: (1) a polymer electrode including (A) an organic conjugated compound; and (B) an ionically conductive polymer electrolyte, wherein the organic conjugated compound and the ionically conductive polymer electrolyte form a bicontinuous interpenetrating network, in which the organic conjugated compound and the ionically conductive polymer electrolyte form distinct continuous phases and an average phase size of the organic conjugated compound in the bicontinuous interpenetrating network is in the order of nanometers e.g., in the order of nanometers; and (2) a separator that is electronically non-conductive and contacts the polymer electrode such that the separator facilitates the transport of charge carriers (ions) to and from the polymer electrode.

The electrochemical energy storage device of the present invention may further include a current collector that is in electrical contact with the polymer electrode. The current collector may be a thin film made from at least one material that is selected from the group consisting of porous graphite, porous, highly doped inorganic semiconductor, highly doped conjugated polymer or carbon particles dispersed in a non-conjugated polymer matrix, aluminum, silver, platinum, gold, palladium, tungsten, indium, zinc, copper, nickel, iron, lead, lead oxide, tin oxide, indium tin oxide, graphite, doped silicon, doped germanium, doped gallium arsenide, doped polyaniline, doped polypyrrole, doped polythiophene, and their derivatives. In one embodiment, a current collector is not required and the polymer electrode of the present invention also serves as the current collector. In this embodiment, carbon particles may be dispersed in the polymer electrode and a concentration of the dispersed carbon particles is higher than a percolation threshold concentration. The percolation threshold concentration of a conductive material ensures that at least one electrically conductive pathway from one end to another end of the polymer electrode is present.

In one embodiment, the separator of the electrochemical energy storage device of the present invention may be a gel electrolyte that conducts ions to and from the polymer electrode and may be at least one of a polymer, copolymer and oligomer having mer units selected from the group consisting of substituted or unsubstituted vinylidene fluoride, urethane, ethylene oxide, propylene oxide, acrylonitrile, methylmethacrylate, alkylacrylate, acrylamide, vinyl acetate, vinylpyrrolidinone, tetraethylene glycol diacrylate, phosphazene and dimethylsiloxane.

In one embodiment of the present invention, the conjugated compound may include a conjugated back-bone that is at least one of a substituted or an unsubstituted homopolymer, copolymer or oligomer having mer units selected from the group consisting of phenylene vinylene, phenylene, fluorene, quinoline, quinoxaline, acetylene, aniline, phenylene-2,6-benzobisoxazole, phenylene-2,6-benzobisoxazole, phenylene-2,6-benzimidazole, arylene, and arylene vinylene. The arylene unit may be one compound selected from the group consisting of naphthalene, anthracene, furylene, thienylene, pyrrole, oxadiazole, selenylene or isothianaphthene. The conjugated back-bone may have attached thereto a side-chain that may include at least one segment selected from the group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene and derivatives thereof. The conjugation in the conjugated compound generally extends for greater than or equal to 3 repeat units and preferably extends for greater than or equal to 6 repeat units.

In another embodiment, the conjugated compound includes a non-conjugated back-bone and a conjugated side chain. The conjugated side-chain may be attached to a non conjugated back-bone which is a polymer without π-conjugation along a back-bone of the polymer. In this embodiment, the non-conjugated back-bone may include at least one compound selected from the group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, (2-(4-carboxyhexafluorobutanoyloxy) ethylmethacrylate and derivatives thereof. The conjugated side-chain includes a substituted or an unsubstituted homopolymer, copolymer or oligomer having mer units selected from the group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene. The arylene unit may be one compound selected from the group consisting of naphthalene, anthracene, furylene, thienylene, pyrrole, oxadiazole, selenylene or isothianaphthene.

In yet another embodiment of the present invention, the conjugated compound is a block copolymer or oligomer, in which a back-bone has conjugated and non-conjugated segments as described above.

In one embodiment of the present invention, the polymer electrolyte may have an ionic conductivity that is at least about 100 times greater than an electronic conductivity of the polymer electrolyte. The polymer electrolyte may include an ionically conductive polymer complexed with a salt. The polymer electrolyte may include at least one compound selected from a first group consisting of a side group, a segment, a homopolymer, copolymer or a crosslinked network and the compounds of the first group may have mer units selected from a second group consisting of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives thereof.

In another embodiment of the present invention, the polymer electrolyte may include a polyelectrolyte and a counter ion. The polyelectrolyte may include a polymer or copolymer having mer units selected from the group consisting of 2-sulfonethyl methacrylates, (diallydimethyl ammonium) chloride, styrene sulfonate, tetrafluoroethylene-{{2-(2-sulfonato-1,1,2,2-tetrafluoroethyloxy)-2-(trifluoromethyl)-1,1,2-trifluoroethyloxy}-trifluoroethylene} salts, (p-phenylene terephthalamide sulfonate) salts, oligo (ethylene oxide) methacrylate-co-methacrylate salt and derivatives thereof. The counter ion may be selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium, fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate and benzoate.

The polymer electrode may further include a salt having cations and anions. The cations may include at least one cation selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium and tetraphenyl ammonium. The anions in the salt may include at least one anion selected from the group consisting of fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate and benzoate.

The average diameter of a strand of the conjugated compound in the bicontinuous interpenetrating network may generally be between about 1 nanometer and about 1 micrometer and preferably be between about 20 and about 500 nanometers. The conjugated compound may generally have an energy gap that is at least about 1 eV and preferably have an energy gap that is more than about 2 eV.

In one embodiment of the present invention, the electrochemical energy storage device may further include a counterelectrode that is different from the polymer electrode mentioned above and the counterelectrode includes at least one material selected from the group consisting of lithium alloy, lithium insertion compounds and metal. The electrochemical energy storage device may be a secondary battery. The electrochemical energy storage device may further contain an additive that includes at least one of a surfactant, plasticizer and a low molecular weight compound.

In yet another aspect, the present invention provides another i electrochemical energy storage device. This electrochemical energy storage device includes a polymer electrode having: (A) a conjugated compound; (B) an ionically conductive polymer electrolyte; and (C) a surfactant having a first moiety that has an affinity for the conjugated compound and a second moiety that has an affinity for the polymer electrolyte such that the presence of the surfactant renders the conjugated compound and the polymer electrolyte sufficiently partially miscible in the solution such that the conjugated compound and the polymer form a bicontinuous interpenetrating network, in which the conjugated compound and the polymer electrolyte form distinct continuous phases and a strand of the conjugated compound has an average diameter that is at most about 1 micrometer.

In one embodiment, the surfactant may include at least one compound selected from the group consisting of N,N-diethyldodecanamide, stearamide, N-dodecylpyrrolidinone, octylcyanoacetate, dodecanolactone and 2-tert-butylcyclohexanone.

The electrochemical energy storage may further include a plasticizer, which has at least one segment selected from the group consisting of ethylene oxide, polyetheylene glycol, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate, 2-sulfomethyl methacrylates, methylene, ethylene, propylene, alkylene, acrylate, carbonate, styrene, ester, urethane, siloxane, phosphazene, amide, imide, itaconate, glutamate, p-phenylterephthalate, tetramethyl ammonium, tetraethyl ammonium, tetrapropyl ammonium, tetrabutyl ammonium, tetradecyl ammonium, tribenzylphenyl ammonium, tetraphenyl ammonium, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate, benxoate, crown ethers, dimethylphthalate, dibutylphthalate, 1,2,4-butanetriol-trinitrate, pentabromo-diphenyl ether arylphosphate, glycerine, sulfone amide, phosphate ester, benzoate ester and derivatives thereof.

The conjugated compound and the polymer electrolyte may be substantially immiscible in a solution of the conjugated compound and the polymer electrolyte without the surfactant. The electrochemical energy storage device may further include a separator that conducts ions to and from the polymer electrode. The electrochemical energy storage device may be a secondary battery or an electrochemical energy capacitor.

In yet another aspect, the present invention provides yet another electrochemical energy storage device. The electrochemical energy storage device includes a polymer electrode having: (A) a conjugated compound having a side-chain; and (B) an ionically conductive polymer electrolyte, wherein the side-chain of the conjugated compound has an affinity for the polymer electrolyte such that the conjugated compound and the polymer electrolyte are partially miscible and form a bicontinuous interpenetrating network. The side chain serves to reduce the average phase size of the components. Thus, an average diameter of a plurality of strands of the conjugated compound is less than it would be if the side chains were not present.

These and other features of the present invention will be described in more detail below in the detailed description of the invention and in conjunction with the following figures.

DETAILED DESCRIPTION OF THE PREFERRED EMBODIMENTS

To achieve the foregoing, the present invention provides high performance, low-cost, flexible film polymeric electrochemical energy storage devices for portable electronics applications. In the following description, numerous specific details are set forth in order to provide a thorough understanding of the present invention. It will be apparent, however, to those skilled in the art, that the present invention may be practiced without some or all of the specific details. In other instances, well known process steps have not been described in detail in order to not unnecessarily obscure the invention.

It is well known in the electrochemical cell technology that the energy density of an electrochemical cell may be raised by increasing the stored charge density and the cell voltage. To this end, the present invention provides an electrochemical energy storage device including at least one polymer electrode having a bicontinuous interpenetrating network, in which an organic conjugated compound (hereinafter referred to as the "conjugated compound") and an ionically conductive polymer electrolyte are present in distinct continuous phases and the average phase size of the conjugated compound in the interpenetrating network is on the order of nanometers.

The bicontinuous interpenetrating network of an electrode of the present invention effectively drives up the stored charge density when the following advantages are realized in concert. By way of example, the three-dimensional bicontinuous interpenetrating network increases the conjugated compound/electrolyte interface area and thereby minimizes the effective distances through which ions diffuse during doping and dedoping of the conjugated compound.

As another example, a larger conjugated compound/polymer electrolyte interface also increases the volume of the conjugated compound exposed to the electrolyte for ion exchange. Hence, the maximum allowable doping concentration in the conjugated compound is increased. As yet another example, shorter effective distances for ion diffusion in the presence of a polymer electrolyte having a high ionic conductivity reduces the time required for doping the polymer electrode.

In order to increase the energy density of the electrochemical cell by increasing the cell voltage, the present invention employs conjugated polymers with the appropriate energy gap and appropriate levels of lowest unoccupied molecular orbital (LUMO) and highest occupied molecular orbital (HOMO).

As explained below, formation of the bicontinuous interpenetrating network, in accordance with one embodiment of the present invention, is facilitated by selecting an appropriate moiety or side-chain that is attached to the backbone of the conjugated compound or the polymer electrolyte. Additionally, in this embodiment, additives, such as a surfactant, a plasticizer or a low molecular weight compound may be added to improve physical properties. By way of example, the addition of a surfactant to a mixture of conjugated compound and polymer electrolyte facilitates in forming a more compact bicontinuous interpenetrating network. As another example, the addition of a plasticizer enhances the mechanical properties of the electrode having the bicontinuous interpenetrating network.

Alternatively, at least one of a surfactant or a plasticizer or other low molecular weight compounds may be added, in other embodiments of the present invention, to facilitate the formation of the bicontinuous interpenetrating network having a nanometer scale phase size. In this embodiment, the side-chain attached to the back-bone of the conjugated compound need not be chemically compatible to the polymer electrolyte in the bicontinuous interpenetrating network. As is explained below, the present invention fully exploits the processing advantages of a polymer-based system to yield an electrochemical energy storage device that provide energy densities that are high enough to be employed in portable electronic applications.

Figure 1:
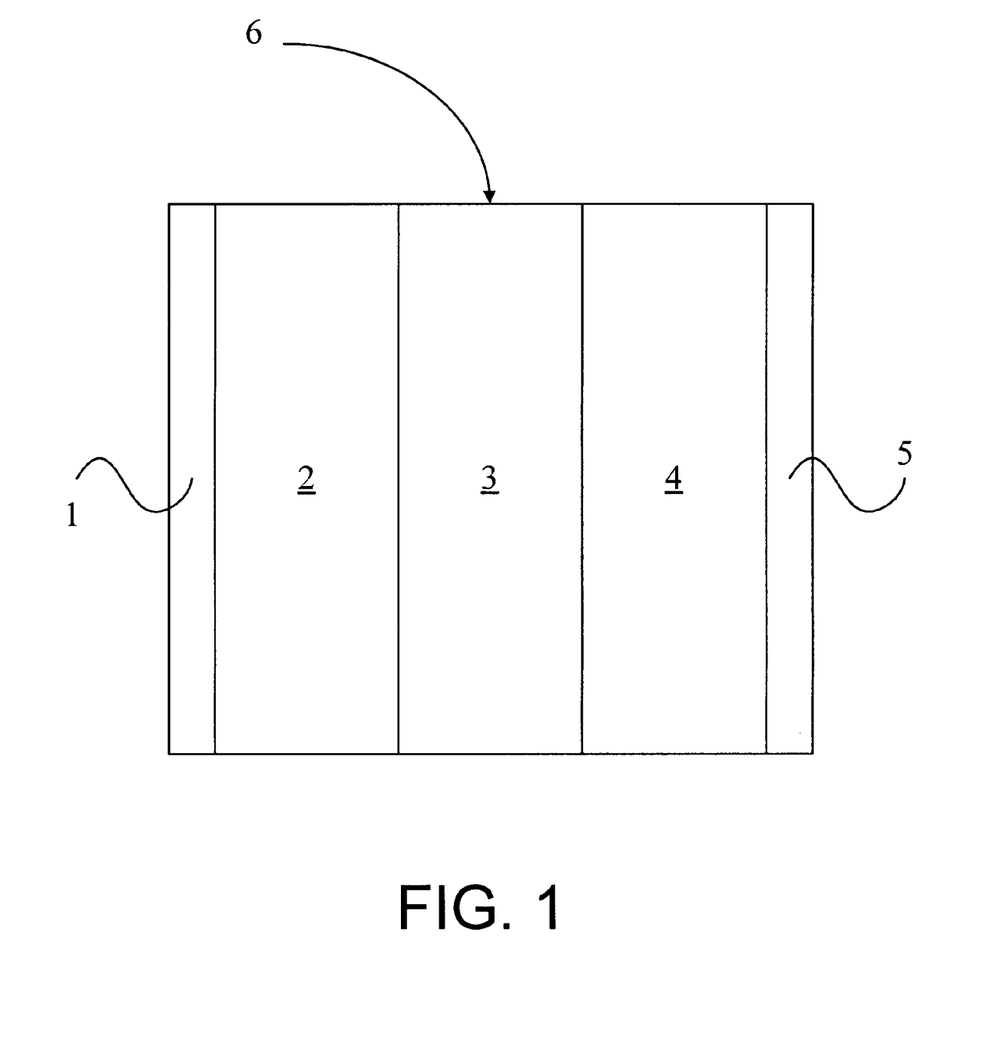
FIG. 1 shows a side-sectional view of an electrochemical charge storage device, according to one embodiment of the present invention.

FIG. 1 shows an electrochemical energy storage device 6, according to one embodiment of the present invention, which includes current collectors 1 and 5, electrodes 2 and 4 that are separated by polymer electrolyte separator 3.

Although electrochemical energy storage device 6 is an electrochemical battery, it should be borne in mind that electrochemical energy storage device of the present invention includes other devices, e.g., electrochemical capacitors, that operate via electrochemical energy storage. Preferably, however, electrochemical energy storage device 6 is an electrochemical battery that is capable of repeatedly discharging through an external load and recharging by an external energy source.

Current collectors 1 and 5 may be made from thin films, which include at least one material selected from the group consisting of porous graphite, porous, highly doped inorganic semiconductor, highly doped conjugated polymer or carbon particles dispersed in a non-conjugated polymer matrix, aluminum, silver, platinum, gold, palladium, tungsten, indium, zinc, copper, nickel, iron, lead, lead oxide, tin oxide, indium tin oxide, graphite, doped silicon, doped germanium, doped gallium arsenide, doped polyaniline, doped polypyrrole, doped polythiophene, and derivatives and mixtures thereof.

In one embodiment, both electrode 2 and 4 are polymer electrodes that include the bicontinuous interpenetrating network having a nanometer scale phase size. In an alternative embodiment, however, electrode 2 is a polymer electrode that includes the bicontinuous interpenetrating network having a nanometer scale phase size and the counterelectrode, electrode 4, may include at least one material selected from the group consisting of lithium, lithium alloy, lithium insertion compounds and other active metals such as zinc and aluminum.

The polymer electrode of the present invention, in one embodiment, includes a conjugated compound that is not necessarily, but preferably electrically conductive and a polymer electrolyte that is ionically conductive to form the bicontinuous interpenetrating network, in which the conjugated compound and the polymer electrolyte form distinct continuous phases. Furthermore, the average phase size (shown in FIG. 2 as "d" denoted by reference numeral 16) of the conjugated compound in the bicontinuous interpenetrating network is on the order of nanometers. Thus, the bicontinuous interpenetrating network is referred to as the "bicontinuous interpenetrating network having a nanometer scale phase size" or "bicontinuous interpenetrating network of nanometer scale" in the description of this invention.

An organic conjugated compound of the present invention includes a conjugated polymer, for example. In one embodiment of the present invention, the conjugation is on the back-bone, which may have substituted thereon at least one moiety or side chain that is chemically compatible to the polymer electrolyte in the bicontinuous interpenetrating network having nanometer scale phase size. The length of the conjugation in the conjugated polymer back-bone may be sufficiently long so that the conjugated portion of the back-bone imparts to the conjugated compound adequate electrical conductivity. The conjugation in the conjugated compound may extend for greater than or equal to 3 repeat units and preferably extends for greater than or equal to 6 repeat units. A conjugated compound having a conjugated back-bone may include substituted or unsubstituted homopolymer or copolymer having mer units selected from the group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene, wherein arylene is naphthalene, anthracene, furylene, thienylene, pyrrole, oxadiazole, selenylene or isothianaphthene and mixtures thereof. The conjugated back-bone may also include an oligomer having a low molecular weight moiety with mer units selected from the group of mer units of homopolymers and copolymers mentioned above.

Alternatively, in an another embodiment of the present invention, the conjugation is on the side-chain that is attached to a non conjugated back-bone, such as methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and their derivatives or any other polymer without $\pi$-conjugation along its back-bone. The conjugated side-chains, in this embodiment, may be a segment of mer units selected from the group of mer units of the conjugated back-bone mentioned above.

The organic conjugated compound of the present invention may also be a block copolymer or oligomer, in which the back-bone has conjugated and non-conjugated segments. The conjugated segments of the block copolymer may include mer units selected from the group of mer units of the conjugated polymer back-bone mentioned above. The non conjugated segments of the block copolymer may include mer units selected from the group of mer units of the non conjugated back-bone listed above.

In order to maximize the energy density of the electrochemical energy storage device, it is preferable to have the ratio of conjugated compound to the total mass of the device as close to unity as practically possible. Consequently, it is desirable to maximize the thickness of the composite material comprising the interpenetrating network, without sacrificing ionic conductivity. Thus, in one embodiment, the present invention employs an ionically conductive polymer that is complexed with a salt to form a polymer electrolyte with the necessary high ionic conductivity. The population of ionic species in the interpenetrating network of the present invention should be sufficiently high such that the conjugated compound phase is rendered highly electronically conductive upon completion of electrochemical doping. In addition, the ionic conductivity of the polymer electrolyte should be at least about 100 times greater than its electronic conductivity.

In one embodiment, the polymer electrolyte in the bicontinuos interpenetrating network having nanometer scale phase size, includes a side group or a segment or homopolymer or copolymer or a crosslinked network having mer units selected from the group consisting of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and their derivatives.

In another embodiment, a polyelectrolyte (single ion conductor) along with its counter ion serves as the polymer electrolyte. By way of example, such polyelectrolytes include a polymer or copolymer having mer units selected from the group consisting of 2-sulfonethyl methacrylates, (diallydimethyl ammonium) chloride, styrene sulfonate, tetrafluoroethylene-{{2-(2-sulfonato-1,1,2,2- tetrafluoroethyloxy)-2-(trifluoromethyl)-1,1,2-trifluoroethyloxy}-trifluoroethylene} salts, p-phenylene terephthalamide sulfonate salts, oligo (ethylene oxide) methacrylate-co-methacrylate salt and derivatives thereof.

Furthermore, the counter ion is selected from the group consisting lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium, fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate and benzoate.

In the conjugated back-bone embodiment of the present invention, the attached side chains may be chosen so that the solubility of the organic conjugated compound is enhanced. Representative side chains include at least one segment selected from the group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene and their derivatives.

In order to form a bicontinuous interpenetrating network of nanometer scale phase size, it is preferable to employ side chains that are chemically compatible to the polymer electrolyte. The phrase "the side chain is chemically compatible to the polymer electrolyte," as used in connection with the description of this invention, means that the side chain has a segment that is chemically identical (or at least quite similar) to a segment in the polymer electrolyte. By way of example, preferable side chains include ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene and their derivatives.

The electrode of the present invention may also include a salt made of cations and anions. Cations in the salt may be selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium and mixtures thereof. Anions in the salt may be selected from the group consisting of fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoracetate, tetraphenylborate, toluene sulfonate, dodecylbenzene sulfonate, camphor sulfonate, picrate, salicylate, thiocyanate and benzoate and mixtures thereof.

In order to minimize power loss due to self-discharge, the conjugated compound/polymer electrolyte interpenetrating network, which provides an electron conduction pathway, is interrupted by a separator 3 containing no electron conductors or semiconductors. The electronic conductivity of separator 3 is preferably as small as possible because electronic conduction in the separator causes an internal short circuit.

In one embodiment, separator 3 is a gel electrolyte rather than a liquid electrolyte. Liquid electrolytes are undesired to serve as separators because it is necessary to hold the liquid in a can. Polymer gel electrolytes, in contrast, do not have such constraints and lend the electrochemical energy storage device of the present invention to thin film processability. Furthermore, in order to optimize ionic transport in a high performance electrochemical energy storage device, gel electrolytes are preferred because they have a higher ionic conductivity (approximately $10^{-3}$ S/cm) than a solid polymer electrolyte.

Gel separator may be at least one of a polymer, copolymer and oligomer having mer units selected from the group consisting of substituted and unsubstituted vinylidene fluoride, urethane, ethylene oxide, propylene oxide, acrylonitrile, methylmethacrylate, alkylacrylate, acrylamide, vinyl acetate, vinylpyrrolidinone, tetraethylene glycol diacrylate, dimethylsiloxane, etc.

In one embodiment, separator 3 includes in its gelling solution (as explained later) at least one solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, N-methyl-2-pyrrolidinone, chlorobenzene, ortho-dichlorobenzene (ODCB), γ-butyrolactone, poly(ethylene glycol), dibutyl phthalate, dioctyl phthalate and their derivatives. In another embodiment, separator 3 is a blend of common polymers that enhances the mechanical strength of the separator. By way of example, blend may include at least one inert polymer material selected from the group consisting of polyethylene, polypropylene, polytetrafluroethylene, polystyrene, polyethyleneterephthalate and nylon. In this embodiment, the various polymers may be held together by a bonding paste that includes at least one gelling polymer selected from the group consisting polyvinylidene fluoride (PVDF), polyurethane, poly(ethylene oxide), poly (propylene oxide), polyacrylonitrile, polymethylmethacrylate, polyalkylacrylate, polyacrylamide, poly(vinyl acetate), polyvinylpyrrolidinone, poly(tetraethylene glycol diacrylate), and polydimethylsiloxane. The bonding paste may alternatively be a copolymer that includes a combination of gelling polymers mentioned above.

The thickness of the electrode(s) having the bicontinuous interpenetrating network, current collectors 1 and 5 and separator 3 may be of any appropriate thickness. In one embodiment, however, the thickness of the electrode having the bicontinuous interpenetrating network is between about 0.1 μm and about 10,000 μm, the separator 3 is between about 0.02 μm and about 100 μm and the current collectors 1 and 5 is between about 0.02 μm and about 100 μm.

The present invention recognizes that engineering a high cell voltage contributes to the requisite high energy density for commercial portable electronic applications. While intending not to be bound by theory, it is believed that the cell voltage of the electrochemical energy storage device is dependent on the energy gap between the lowest unoccupied molecular orbital (LUMO) and the highest occupied molecular orbital (HOMO) levels of the conjugated polymer. A twisted conjugated polymer back-bone is expected to have a higher energy gap than a planar conjugated polymer back-bone. Consequently, it is preferable to employ, in the interpenetrating network of the present invention, a conjugated polymer having an energy gap that is as large as possible without sacrificing electrochemical stability. More preferably, the energy gap of the conjugated polymer is at least about 1 eV, and even more preferably the energy gap is more than about 2 eV. By way of example, conjugated polymers falling within these classes include poly(1,4-phenylene) (PPP), poly(1,4-phenylene vinylene) (PPV), polyfluorenes (PF), polypyrrole, polyaniline and their derivatives.

Unsubstituted conjugated polymer chains are insoluble in solvents. Those skilled in the art will recognize that it is difficult to make admixed polymer blends, if one of the polymer components is insoluble. The present invention recognizes that the conjugated polymer/polymeric electrolyte interpenetrating network having a phase size of nanometer scale is formed by judiciously choosing components or additives in a solution of conjugated compound and polymer electrolyte that render the conjugated polymer partially miscible in the polymer electrolyte solution. It is important to bear in mind that insoluble conjugated compounds may not yield nanometer scale interpenetrating network with nanometer scale phase sizes.

It is worthwhile to note that conjugated polymers selected in the present invention effectively combine the optical and electronic properties of conventional inorganic semiconductors, such as found in light emitting diodes, photovoltaic cells, and lasers, with the processing advantages and mechanical properties of polymers. Conjugated polymers are electronic semiconductors in their undoped, neutral state and have the capability to undergo completely reversible p-type and n-type electrochemical doping. Electrochemically doped conjugated polymers have high electrical conductivities. This means that electrochemistry can be used to switch conjugated polymers between their semiconducting and conducting states. Thus, the conjugated polymers of the present invention are such that are able to undergo multiple doping and dedoping cycles with high charge capacity and good chemical stability.

The present invention also recognizes that the use of conjugated polymer technology for reversible charge storage is limited by the transport of ions in the conjugated compound, which is a poor ion conductor. Thus, the present invention employs at least one electrode having the bicontinuous interpenetrating network having a nanometer scale phase size, which network reduces the distance traveled by the ions in the conjugated compound phase. As will be explained later, during discharging or recharging of the electrochemical energy storage device of the present invention, the average maximum distance traveled by the ions in the conjugated compound phase of the bicontinuous interpenetrating network of nanometer scale phase size will be equal to the diameter of the conjugated compound strand before it gets to the polymer electrolyte phase.

Figure 2:
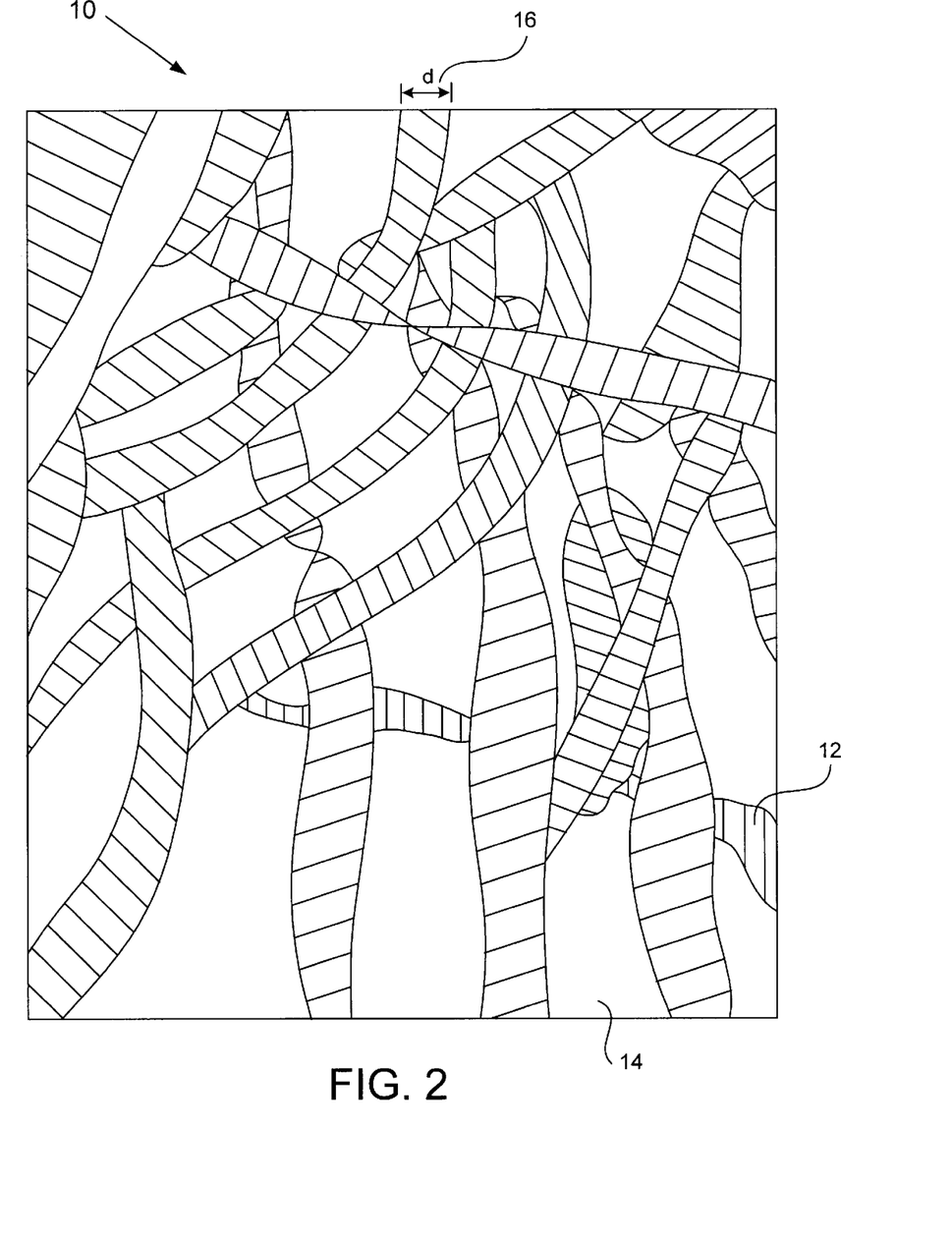
FIG. 2 shows a side-sectional view of a portion of an electrode, according to one embodiment of the present invention, employed in the electrochemical storage device of FIG. 1, that includes a bicontinuous interpenetrating network having a nanometer scale phase size.

FIG. 2 shows a bicontinuous interpenetrating network 10, according to one embodiment of the present invention, of nanometer scale phase size, in which a strand of conjugated compound 12 and polymer electrolyte 14 are present as distinct continuous phases. Each strand of conjugated compound 12 may include one or more fibrils of the conjugated compound. A diameter 16 (labeled "d" in FIG. 2) of a conjugated compound strand represents an average diameter of the plurality of strands 12 in bicontinuous interpenetrating network 10. Diameter 16 also represents the average phase size of the conjugated compound 12 in bicontinuous interpenetrating network 10. As mentioned before, diameter 16 is the average maximum distance traveled by an ion during charging and discharging of the electrochemical energy storage device. The average phase size of the conjugated compound in the bicontinuous interpenetrating network of nanometer scale phase size is generally between about 1 nanometer and about 1 micrometer and preferably between about 20 and about 500 nanometers. Those skilled in the art will recognize that the phase size of the conjugated compound strand may be determined using a scanning electron microscope (SEM), for example.

Bicontinuous interpenetrating network 10 reduces the effect of isolated polymer islands. In a "bulk" sample of conjugated compound where the size of the conjugated compound is substantially larger than the diameter of conjugated compound fibrils, the full reversibility of electrochemical doping during dedoping is limited by the presence of isolated charged islands surrounded by discharged areas. In bicontinuous interpenetrating network 10 of FIG. 2, however, this problem is minimized because the polymer electrolyte having a high ionic conductivity is close to the conjugated compound.

The ability to achieve reversible electrochemical doping is a unique advantage of the present invention. Inorganic semiconductors such as Si and the Group III-V alloys can be doped by the irreversible incorporation of electron deficient or electron rich elements into the lattice, but not electrochemically. Non-conjugated polymers such as polyethylene, polystyrene, polyethylene oxide (PEO), polycarbonate (PC), poly(vinylidene fluoride) (PVDF), and polyacrylonitrile, are electronic insulators and cannot undergo electrochemical doping to attain high electrical conductivities.

In one embodiment, the conjugated compound of the present invention has pendant solubilizing, flexible side chains, which render the conjugated compound partially miscible in the polymer electrolyte and facilitate in forming the interpenetrating network of nanometer scale phase size shown in FIG. 2. The side-chains of the conjugated compound in this embodiment have an affinity for the polymer electrolyte in the bicontinuous interpenetrating network. The term "affinity," as used in connection with the description of this invention, refers to the similarity in physical properties, e.g., similar electrostatic properties of the side-chain and polymer electrolyte. Furthermore, the partially soluble side chains of the conjugated polymer may be chemically compatible with the polymer electrolyte and form a more compact interpenetrating network relative to the interpenetrating network formed by the conjugated compound (devoid of the compatible side chains) and polymer electrolyte, which are not chemically compatible to each other. In other words, when the conjugated compound is rendered partially miscible in the polymer electrolyte, there is a higher degree of interpenetration between the conjugated compound and the polymer electrolyte and a larger surface area of the conjugated compound is exposed to the polymer electrolyte in the interpenetrating network. As a result, there is a reduction in the average phase size of the conjugated compound. By thermodynamic considerations, the entropy of mixing the conjugated compound and the polymer electrolyte is greater than zero and phase segregation occurs to form the bicontinuous interpenetrating network.

Alternatively, in an another embodiment, the pendant solubilizing, flexible side chains are attached to the polymer electrolyte, instead of the conjugated compound as described above, to render the conjugated compound partially miscible in the polymer electrolyte and facilitate in forming the interpenetrating network of nanometer scale phase size shown in FIG. 2. Thus, in the embodiment, the side-chains of the polymer electrolyte have an affinity for the conjugated compound in the bicontinuous interpenetrating network.

In the above described embodiments, the concentration of each phase, i.e. the conjugated compound or the polymer electrolyte, in a blend of the conjugated compound and the polymer electrolyte is above its percolation threshold. Those skilled in the art will recognize that the percolation threshold ensures that there is one conductive pathway from one side of the interpenetrating network to another. Furthermore, the percolation threshold concentration, in connection with the description of this invention, refers to the concentration of one phase in the blend of the conjugated compound and the polymer electrolyte above which there is a possibility of finding a conducting pathway from one side of the sample to another. In practical terms, concentrations of a phase in the interpenetrating network above the percolation threshold may be accomplished by measuring the conductivity (electronic or ionic) of the interpenetrating network as a function of the concentration of each phase, identifying percolation thresholds and making blends of the two phases that have concentrations above those thresholds. The appropriate concentrations of a phase in a blend of two compounds may generally be more than about 10% of the percolation threshold concentration and preferably be more than about 20% of the precolation threshold concentration.

The blend of conjugated compound and the polymer electrolyte may include a plasticizer to enhance the mechanical properties of the bicontinuous interpenetrating network. The blend may additionally or alternatively also include a low molecular weight compound that has the appropriate miscibility in the conjugated compound and polymer electrolyte matrix to enhance the ionic conductivity of the bicontinuous interpenetrating network.

Appropriately selected side-chains on the conjugated compound that are ionic or are ion-solvating moieties may also enhance ionic transport to the conjugated compound. Conjugated compound with ionic side chains are also called conjugated polyelectrolytes or rigid-rod polyelectrolytes and depending upon the choice of pending ionic moiety, the conjugated compound may be water-soluble. Solubility of the conjugated compound in water allows fabrication of an electrochemical energy storage device without the use of organic solvents. In addition to water solubility, conjugated polyelectrolytes show good electrical conductivity (0.01–10 S cm$^{-1}$) as cast films and exhibit a novel feature called self-doping. Upon p-type doping (oxidation) in a conventional conjugated compound, in which an electron is taken away from the compound, an anion (available from the polymer electrolyte phase) is incorporated to preserve electrical neutrality. In a self-doped polymer, an electron is taken away and a cation is ejected from the ionic side chain, leaving behind the attached anion.

By way of example, a conjugated compound of the present invention is poly (9,9-bis (3,6-dioxaheptyl)-fluorene-2,7-diyl] (BDOH-PF), which has a poly (1,4-phenylene) main chain that is capable of transporting electrons and holes, while the bis (3,6-dioxaheptyl) side groups function to solvate ions and promote ion transport as required for high performance electrodes.

As explained above, in one embodiment, the interpenetrating network of the present invention is formed by selecting the appropriate side-chain. In an alternative embodiment, however, the interpenetrating network of the present invention is formed by admixing a liquid additive, e.g., a surfactant, with the blend of the conjugated compound and polymer electrolyte. In this embodiment, the additive includes a first moiety that has an affinity for the conductive conjugated compound and a second moiety that that has an affinity for the polymer electrolyte. As a result, the presence of the additive in a solution that includes the conjugated compound and the polymer electrolyte renders the conjugated compound and the polymer electrolyte sufficiently partially miscible in the solution such that the conjugated polymer and polymer electrolyte form the bicontinuous interpenetrating network having a nanometer scale phase size.

In this embodiment, a side chain of the conjugated compound that is not chemically compatible with the polymer electrolyte may form an interpenetrating network, in which the conjugated compound phase size is not in the order of nanometers. Adding a liquid additive, however, that includes a (linear molecule) surfactant having a polar end and a non-polar end builds an interconnecting bridge between the conjugated compound and the polymer electrolyte such that the polar end of the bridge connects to the polymer electrolyte and the non-polar end of the bridge connects to the conjugated compound. As a result, more surface area of the conjugated compound is exposed to the polymer electrolyte and a higher degree of interpenetration between the conjugated compound and the polymer electrolyte is realized. Consequently, the resulting conjugated compound phase size in the interpenetrating network is reduced to a desired nanometer scale. Thus, in this embodiment, the appropriately selected moieties, e.g., polar and non-polar moieties, of a surfactant, for example, admixed with conjugated compound and polymer electrolyte blend facilitates in forming a compact nanometer scale phase size of the present invention.

As mentioned above, addition of a judiciously chosen additive (e.g., surfactant) has the effect of optimizing the phase behavior of the bicontinuous interpenetrating network and maximizing the interfacial area between the two phases. The additive preferably has a relatively high dielectric constant to enhance the ionic conductivity. Furthermore, the presence of additive improves electrochemical doping, which in turn increases the density of electrochemically generated electrons and holes. The additive also preferably has a relatively high boiling point and plasticizing properties.

Representative surfactants employed in the present invention include N,N-diethyldodecanamide, stearamide, N-dodecylpyrrolidinone, octylcyanoacetate, dodecanolactone and 2-tert-butylcyclohexanone and mixtures thereof.

If the chosen additive as mentioned above does not have the appropriate plasticizing properties, a plasticizer may be added to the mixture of conjugated compound, polymer electrolyte and additive. Those skilled in the art will recognize that it is, however, preferable to employ an additive that facilitates in rendering the conjugated compound miscible in the polymer electrolyte and also serves as a plasticizer. The plasticizer employed in the present invention may include at least one segment selected from the group consisting of ethylene oxide, polyetheylene glycol, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) 2-(4-carboxyhexafluorobutanoyloxy) ethylmethacrylate, sulfonethyl methacrylates, methylene, ethylene, propylene, alkylene, acrylate, carbonate, styrene, ester, erethane, siloxane, phosphazene, amide, imide, itaconate, glutamate, p-phenylterephthalate, tetramethyl ammonium, tetraethyl ammonium, tetrapropyl ammonium, tetrabutyl ammonium, tetradecyl ammonium, tribenzyl-phenyl ammonium, tetraphenyl ammonium, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate, benxoate, crown ethers, dimethylphthalate, dibutylphthalate, 1,2,4-butanetriol-trinitrate, pentabromodiphenyl ether, arylphosphate, glycerine, sulfone amide, phosphate ester, benzoate ester and their derivatives.

A process, according to one embodiment of the present invention, of forming the bicontinuous interpenetrating network of FIG. 2 includes: (1) preparing in a common solvent, e.g., tetrahydrofuran, or a solvent, a solution of the polymer electrolyte and the conjugated compound; (ii) intimately mixing the solution; (iii) casting the solution in a substrate; and (iv) removing the solvent. Those skilled in the art will recognize that in the embodiment where a surfactant is required to form the interpenetrating network of the present invention, the surfactant may be mixed with the polymer electrolyte and conjugated compound before intimate mixing commences.

A process, according to one embodiment of the present invention, of forming electrochemical energy storage device 6 of FIG. 1 begins when a conductive foil, e.g., a nickel foil, which serves as a current collector layer is deep cast in a dilute solution of conductive polymer to produce a film having a thickness of between about 0.02 $\mu$m and about 0.2 $\mu$m. Next, the conductive foil is deep cast in a highly viscous solution that includes a conjugated compound, a polymer electrolyte, salt, solvent (and additives if necessary as mentioned above). The conductive foil including the film of viscous solution is then dried to remove the solvent. The film produced may include a bicontinuous interpenetrating network having a nanometer scale phase size, as shown in FIG. 2. A surfactant, octylcyanoacetate (OCA), may be added to the above-described mixture in a ratio (to the conjugated compound) of about 0.25:1 by weight. The resulting thickness of the electrode may be as high as about 1000 $\mu$m.

It is important to note that the solvent employed in the viscous solution may be a mixture of solvents and the solvents in the mixture preferably have similar solvation properties towards different soluble polymers, i.e. the polymer electrolyte and conjugated polymer. Furthermore, if the conjugated compound is dissolved in a first solvent and the polymer electrolyte is dissolved in a second solvent, then it is preferable to have the first and second solvents miscible in each other. In order to avoid precipitation when one of the two solvents in the mixture is being evaporated and to ensure similar evaporation rates for the two solvents, the first and second solvents preferably have similar boiling points.

After the electrode is fabricated as described above, a heated separator layer is spread on the electrode and cooled down to a gel form. While the gel solution is cooling down, a portion of gel layer may be cut off using a "doctor blade" technique to produce a thin gel film having a thickness of about 10 $\mu$m. The second electrode/current collector may then be mounted gently on top of the gel film to form the electrochemical energy storage device shown in FIG. 1.

In a preferred embodiment of the present invention, a polymeric network by cross-linking is formed in the gel film and electrode layer before the electrode layers are assembled. Cross-linking enhances the film or layer's mechanical properties and raises the glass transition temperature. Conventional methods well known to those skilled in the art may be employed for fabricating ionically conductive networks, aqueous electrolytes that are cross-linked by radiation, acryloyl compounds that are cross-linked by polymerization, and a gel electrolyte as a "glue" to hold two electrodes together. Those skilled in the art will recognize that cross-linking applied to the polymer component in the separator layer and to the polymer components in the interpenetrating network of FIG. 2 optimizes the film's mechanical, chemical, and thermodynamic stability.

In the above-described process, instead of a current collector layer, a dispersed carbon (above the percolation threshold) is introduced in the electrode film to increase the electrical conductivity within the electrode. A thick electrode layer is then prepared on a non-adhesive substrate (e.g., Teflon®).

The separator gel film employed in this embodiment may be dissolved in an ethylene carbonate and propylene carbonate solvent mixture, polyacrylonitirile and a salt in a ratio of 0.7:0.2:0.1 by weight. In another embodiment, the cross-linked gel film is prepared by spreading a solution of monomer mixture and additives (e.g., cross-linking reagent) in an appropriate solvent or solvent mixture on a non-adhesive substrate (e.g., Teflon®). By way of example, the solution for preparing a cross-linked gel film includes poly (ethylene glycol), ethylene carbonate and propylene carbonate solvent mixture, a salt and a cross-linking reagent, such as dianhydride or a plasticizer mentioned above. While the solution is undergoing cooling, the gel film is cut off by the "doctor blade" technique to produce the film having a thickness of about 10 $\mu$m. The cross-linking of the gel film is then carried out (under heat and/or light, for example) to have a thin, cross-linked gel film. On top of the gel film, a high viscous solution of the electrode components is then applied and dried as mentioned above. Next, the two films are mounted on the current collector foil and the non-adhesive substrate is peeled off. The second electrode solution is then spread on the back side of the separator gel layer, dried and a second current collector is mounted on top of the second electrode layer to form a electrochemical energy storage device of the present invention.

In one example, a solution including a PPP derivative, e.g., poly[3'-(methyleneoxide-1,2-ethylenemethyloxide)-(1, 4)-(1',4')-(1",4")-tertphenylene], ionically conductive poly {bis(2-(2-methoxyethoxy)ethoxy)phosphazene} (MEEP), LiBF$_4$ (salt) was prepared in a chloroform solution in a ratio of about 1:0.3:0.45 by weight. The solution was then cast on a substrate according to conventional techniques well known to those skilled in the art and dried on the substrate at a temperature that is between about 0 and about 30° C. to produce a bicontinuous interpenetrating network having a phase size of nanometer scale.

In another example, a PPV precursor, e.g., poly (xylidenetetrahydrothiophenium chloride) was mixed with poly{bis(2-(2-methoxyethoxy)ethoxy)phosphazene} (MEEP) in a solvent mixture in a ratio of about 1:0.3:0.45 by weight. The solvent mixture included water and acetonitrile in a ratio of about 1:5 by volume. The solution was then cast on a substrate according to conventional techniques well known to those skilled in the art and dried on the substrate at a temperature of about 200° C. to produce a bicontinuous interpenetrating network having a phase size of nanometer scale. During the heating step, it was observed that the PPV precursor was transformed to PPV. This example illustrates that in one embodiment, a conjugated back-bone, without the assistance of a chemically compatible side-chain or surfactant and the like, by combining with an ionically conductive polymer electrolyte forms the bicontinuous interpenetrating network of nanometer scale phase size of the present invention.

After forming the bicontinuous interpenetrating network of the nanometer scale phase size, a differential thermal analysis (DTA) may be preformed to show that the conjugated compound and polymer electrolyte are continuously and intimately mixed with each other. The thermal analysis will show an increased melting point for the polymer electrolyte, as compared to the normal melting point, when the conjugated compound and the polymer electrolyte are interpenetrating according to the present invention.

As mentioned before, secondary battery chemistries like Li-polymer require high quality, highly porous electrodes that are expensive. The present invention, however, fully exploits the conjugated polymer-based systems, which are inexpensive because of low cost polymer materials and polymer processing, and therefore effectively provides low-cost conjugated polymer-based electrochemical energy storage devices with energy densities comparable to commercially available secondary battery chemistries. Furthermore, as explained above, the electrochemical energy storage device of the present invention lends itself to thin film processability, which provides significant flexibility in the possible variety of device shapes and sizes. Judiciously chosen conjugated compounds and polymer electrolyte, for example, allow the present invention is to provide a secondary battery with a capability to repeatedly discharge through an external load and recharge by an external energy source.

Although the foregoing invention has been described in some detail for purposes of clarity of understanding, it will be apparent that certain changes and modifications may be practiced within the scope of the appended claims. For example, while the specification has been described in terms of an electrochemical battery, there is in principal no reason why other electrochemical energy storage devices like a electrochemical energy capacitor cannot be fabricated by the teachings of the present invention. Therefore, the present embodiments are to be considered as illustrative and not restrictive, and the invention is not to be limited to the details given herein, but may be modified within the scope of the appended claims.

What is claimed is:

1. An electrochemical energy storage device, comprising:
   polymer electrode including:
      an organic conjugated compound; and
      an ionically conductive polymer electrolyte, wherein said organic conjugated compound and said ionically conductive polymer electrolyte form a bicontinuous interpenetrating network, in which said organic conjugated compound and said ionically conductive polymer electrolyte form distinct continuous phases and wherein an average diameter of said organic conjugated compound phase in said bicontinuous interpenetrating network is less than about 1 micrometer; and
   a separator that is electronically non-conductive and contacts said polymer electrode such that said separator facilitates the transport of ions to and from said polymer electrode.

2. The electrochemical energy storage device of claim 1, further comprising a current collector that is in electrical contact with the polymer electrode, said current collector is a thin film made from at least one material that is selected from the group consisting of porous graphite, porous, doped inorganic semiconductor, doped conjugated polymer or carbon particles dispersed in a non-conjugated polymer matrix, aluminum, silver, platinum, gold, palladium, tungsten, indium, zinc, copper, nickel, iron, lead, lead oxide, tin oxide, indium tin oxide, graphite, doped silicon, doped germanium, doped gallium arsenide, doped polyaniline, doped polypyrrole, doped polythiophene, and derivatives of said material of said group.

3. The electrochemical energy storage device of claim 1, wherein said separator is a gel electrolyte that conducts ions to and from said polymer electrode and includes at least one of a polymer, copolymer and oligomer having mer units selected from the group consisting of substituted or unsubstituted vinylidene fluoride, urethane, ethylene oxide, propylene oxide, acrylonitrile, methylmethacrylate, alkylacrylate, acrylamide, vinyl acetate, vinylpyrrolidinone, tetraethylene glycol diacrylate, phosphazene and dimethylsiloxane.

4. The electrochemical energy storage device of claim 1, wherein carbon particles are dispersed in said polymer electrode and a concentration of said dispersed carbon particles is higher than a percolation threshold concentration, said percolation threshold concentration of a conductive material ensures that at least one electrically conductive pathway from one end to another end of said polymer electrode is present.

5. The electrochemical energy storage device of claim 1, wherein said conjugated compound includes a conjugated back-bone that is at least one of a substituted or an unsubstituted homopolymer, copolymer or oligomer having mer units selected from the group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene, said arylene is one compound selected from the group consisting of naphthalene, anthracene, furylene, thienylene, pyrrole, oxadiazole, selenylene or isothianaphthene.

6. The electrochemical energy storage device of claim 5, wherein the organic conjugated compound includes a side-chain, and wherein the side chain includes at least one segment selected from the group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene and derivatives of said segments of said group.

7. The electrochemical energy storage device of claim 1, wherein conjugation in the conjugated compound extends for greater than or equal to 3 repeat units.

8. The electrochemical energy storage device of claim 7, wherein conjugation in the conjugated compound extends for greater than or equal to 6 repeat units.

9. The electrochemical energy storage device of claim 1, wherein said conjugated compound includes a non-conjugated back-bone and a conjugated side chain, wherein said non-conjugated back-bone includes at least one segment selected from a group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis- (methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives of said compounds of said group and said conjugated side-chain includes a substituted or an unsubstituted homopolymer, copolymer or oligomer having mer units selected from the group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene, wherein arylene is one compound selected from the group consisting of naphthalene, anthracene, furylene, thienylene, pyrrole, oxadiazole, selenylene or isothianaphthene.

10. The electrochemical energy storage device of claim 1, wherein said conjugated compound includes a conjugated side-chain attached to a non conjugated back-bone that is a polymer without $\pi$-conjugation along a back-bone of said polymer.

11. The electrochemical energy storage device of claim 1, wherein said conjugated compound is a block copolymer or oligomer, in which a back-bone has conjugated and non-conjugated segments.

12. The electrochemical energy storage device of claim 1, wherein said polymer electrolyte has an ionic conductivity that is at least about 100 times greater than an electronic conductivity of said polymer electrolyte.

13. The electrochemical energy storage device of claim 1, wherein said polymer electrolyte includes an ionically conductive polymer complexed with a salt.

14. The electrochemical energy storage device of claim 1, wherein said polymer electrolyte includes at least one compound selected from a first group consisting of a polymer having a side group, a homopolymer, copolymer or a crosslinked network, said compound having mer units selected from a second group consisting of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives of said mer units of said second group.

15. The electrochemical energy storage device of claim 1, wherein said polymer electrolyte includes a polyelectrolyte and a counter ion, wherein said polyelectrolyte includes a polymer or copolymer having mer units selected from the group consisting of 2-sulfonethyl methacrylates, (diallydimethyl ammonium) chloride, styrene sulfonate, poly(tetrafluoroethylene)-co-poly {{2-(2-sulfonato1,1,2,2-tetrafluoroethyloxy)-2-(trifluoromethyl)-1,1,2-trifluoroethyloxy}-trifluoroethylene}, (p-phenylene terephthalamide sulfonate) salts, oligo (ethylene oxide) methacrylate-co-methacrylate salt and derivatives of said polymer or said copolymer of said group, and said counter ion is selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium, fluorine, chlorine, bromine, iodine, perchlorate, biomate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate and benzoate.

16. The electrochemical energy storage device of claim 1, further comprising a salt having cations and anions, wherein said cations include at least one cation selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium and tetraphenyl ammonium, and said anions in said salt include at least one anion selected from the group consisting of fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoracetate, tetraphenylborate, toluene sulfonate, dodecylbenzene sulfonate, camphor sulfonate, picrate, salicylate, thiocyanate and benzoate.

17. The electrochemical energy storage device of claim 1, wherein said average diameter of said conjugated compound phase is between about 1 nanometer and about 1 micrometer.

18. The electrochemical energy storage device of claim 17, wherein said average diameter of said conjugated compound phase is between about 20 and about 500 nanometers.

19. The electrochemical energy storage device of claim 1, wherein said conjugated compound has an energy gap that is at least about 1 eV.

20. The electrochemical energy storage device of claim 19, wherein said conjugated compound has an energy gap that is more than about 2 eV.

21. The electrochemical energy storage device of claim 1, further comprising a counterelectrode that is different from said polymer electrode and said counterelectrode includes at least one material selected from the group consisting of lithium alloy, lithium insertion compounds and metal.

22. The electrochemical energy storage device of claim 1, wherein said electrochemical energy storage device is a secondary battery.

23. The electrochemical energy storage device of claim 1, further comprising an additive that includes at least one of a surfactant and a plasticizer, wherein the plasticizer is provided in either or both of the organic conjugated compound phase and the polymer electrolyte phase.

24. A electrochemical energy storage device comprising:
   a polymer electrode having
      a conjugated compound;
      an ionically conductive polymer electrolyte; and
      a surfactant having a first moiety that has an affinity for said conjugated compound and a second moiety that has an affinity for said polymer electrolyte such that the presence of said surfactant in the polymer electrode together with said conjugated compound and said polymer electrolyte makes said conjugated compound and said polymer electrolyte sufficiently partially miscible in said polymer electrode such that said conjugated compound and said polymer form a bicontinuous interpenetrating network, in which said conjugated compound and said polymer electrolyte form distinct continuous phases and said conjugated compound phase has an average diameter that is at most about 1 micrometer.

25. The electrochemical energy storage device of claim 24, wherein said surfactant includes at least one compound selected from the group consisting of N,N-diethyldodecanamide, stearamide, N-dodecylpyrrolidinone, octylcyanoacetate, dodecanolactone and 2-tert-butylcyclohexanone.

26. The electrochemical energy storage device of claim 24, further comprising a plasticizer that includes at least one segment selected from the group consisting of ethylene oxide, ethylene glycol, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate, 2-sulfonethyl methacrylates, methylene, ethylene, propylene, alkylene, acrylate, carbonate, styrene, ester, erethane, siloxane, phosphazene, amide, imide, itaconate, glutamate, p-phenylterephthalate, crown ethers, dimethylphthalate, dibutylphthalate, 1,2,4-butanetriol-trinitrate, pentabromodiphenyl ether, arylphosphate, glycerine, sulfone amide, phosphate ester, benzoate ester and derivatives of said segments of said group.

27. The electrochemical energy storage device of claim 24, wherein said conjugated compound and said polymer electrolyte are substantially immiscible without the surfactant.

28. The electrochemical energy storage device of claim 24, further comprising a separator that conducts ions to and from said polymer electrode.

29. The electrochemical energy storage device of claim 24, wherein said electrochemical energy storage device is a secondary battery or an electrochemical energy capacitor.

30. An electrochemical energy storage device comprising:
    a polymer electrode including
        a conjugated compound having a side-chain; and
        an ionically conductive polymer electrolyte, wherein said side-chain of said conjugated compound has an affinity for said polymer electrolyte such that said conjugated compound and said polymer electrolyte are partially miscible and form a bicontinuous interpenetrating network, in which the conjugated compound and the polymer electrolyte form distinct continuous phases and wherein an average diameter of of said conjugated compound phase is less than it would be in an identical electrode but in which the conjugated compound did not have the side chain.

31. The electrochemical energy storage device of claim 30, further comprising a current collector that is electrically connected to the polymer electrode and is a thin film that is made from at least one material that is selected from the group consisting of porous graphite, porous, doped inorganic semiconductor, doped conjugated polymer or carbon particles dispersed in a non-conjugated polymer matrix, aluminum, silver, platinum, gold, palladium, tungsten, indium, zinc, copper, nickel, iron, lead, lead oxide, tin oxide, indium tin oxide, graphite, doped silicon, doped germanium, doped gallium arsenide, doped polyaniline, doped polypyrrole, doped polythiophene, and derivatives of said material of said group.

32. The electrochemical energy storage device of claim 30, wherein said conjugated compound includes a conjugated back-bone that is at least one compound selected from a first group consisting of a substituted or an unsubstituted homopolymer, copolymer or oligomer, said compounds of said first group having mer units selected from a second group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene, wherein said arylene is naphthalene, anthracene, furylene, thienylene, pyrrole, oxadiazole, selenylene or isothianaphthene.

33. The electrochemical energy storage device of claim 30, wherein conjugation in the conjugated compound extends for greater than or equal to 3 repeat units.

34. The electrochemical energy storage device of claim 30, wherein said side-chain includes at least one segment selected from the group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene and derivatives of said segments of said group.

35. The electrochemical energy storage device of claim 30, wherein said conjugated compound includes a non-conjugated back-bone and a conjugated side chain, wherein said non-conjugated back-bone includes at least one compound selected from a group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives of said compounds of said group and said conjugated side-chain includes a substituted or an unsubstituted homopolymer, copolymer or oligomer having mer units selected from the group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene, wherein arylene is selected from the group consisting of naphthalene, anthracene, furylene, thienylene, pyrrole, oxadiazole, selenylene or isothianaphthene.

36. The electrochemical energy storage device of claim 30, wherein said conjugated compound is a block copolymer or an oligomer, in which a back-bone has conjugated and non-conjugated segments.

37. The electrochemical energy storage device of claim 30, wherein said polymer electrolyte includes an ionically conductive polymer complexed with a salt.

38. The electrochemical energy storage device of claim 30, wherein said polymer electrolyte includes at least one compound selected from a first group consisting of a polymer having a side group, a homopolymer, copolymer or a crosslinked network, said compound having mer units selected from a second group consisting of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives of said mer units of said second group.

39. The electrochemical energy storage device of claim 30, wherein said polymer electrolyte includes a polyelectrolyte and a counter ion, wherein said polyelectrolyte includes a polymer or copolymer having mer units selected from the group consisting of 2-sulfonethyl methacrylates, (diallyldimethyl ammonium) chloride, styrene sulfonate, tetrafluoroethylene-{{2-(2-sulfonato-1,1,2,2-tetrafluoroethyloxy)-2-(trifluoromethyl)-1,1,2-trifluoroethyloxy}-trifluoroethylene} salts, phenylene terephthalamide sulfonate salts, oligo (ethylene oxide) methacrylate-co-methacrylate salt copolymer, methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives of said polymer or said copolymer of said group, and said counter ion is selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium, fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate and benzoate.

40. The electrochemical energy storage device of claim 30, said polymer electrode further comprising a salt having cations and anions, wherein said cations include at least one cation selected from the group consisting of lithium, sodium, potassium, rubidium, cesium, aluminum, cobalt, silver, barium, calcium, copper, zinc, mangan, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium, and said anions in said salt include at least one anion selected from the group consisting of fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoracetate, tetraphenylborate, toluene sulfonate, dodecylbenzene sulfonate, camphor sulfonate, picrate, salicylate, thiocyanate and benzoate.

41. The electrochemical energy storage device of claim 30, wherein said average diameter of said conjugated compound phase is between about 1 nanometer and about 1 micrometer.

42. The electrochemical energy storage device of claim 30, further comprising a gel separator that is electronically non-conductive and contacts said polymer electrode such that said separator facilitates the transport of ions to and from said polymer electrode, wherein said gel separator includes at least one compound selected from the group consisting of substituted or unsubstituted poly(vinylidene fluoride), polyurethane, poly(ethylene oxide), poly (propylene oxide), polyacrylonitrile, polymethylmethacrylate, polyalkylacrylate, polyacrylamide, poly(vinyl acetate), polyvinylpyrrolidinone, poly(tetraethylene glycol diacrylate), polyphosphazene and polydimethylsiloxane.

43. The electrochemical energy storage device of claim 30, wherein the side-chain of the conjugated compound is chemically compatible with the polymer electrolyte.

44. An electrochemical energy storage device comprising:
a polymer electrode including
a conjugated compound; and
an ionically conductive polymer electrolyte having a side-chain that has an affinity for said conjugated compound such that said conjugated compound and said polymer electrolyte are partially miscible and form a bicontinuous interpenetrating network, in which the conjugated compound and the polymer electrolyte form distinct continuous phases and wherein an average diameter of said conjugated compound phase is less than it would be in an identical electrode but in which the conjugated compound did not have the side chain.

45. The electrochemical energy storage device of claim 44, further comprising a current collector that is electrically connected to the polymer electrode and is a thin film that is made from at least one material that is selected from the group consisting of porous graphite, porous, doped inorganic semiconductor, doped conjugated polymer or carbon particles dispersed in a non-conjugated polymer matrix, aluminum, silver, platinum, gold, palladium, tungsten, indium, zinc, copper, nickel, iron, lead, lead oxide, tin oxide, indium tin oxide, graphite, doped silicon, doped germanium, doped gallium arsenide, doped polyaniline, doped polypyrrole, doped polythiophene, and derivatives of said material of said group.

46. The electrochemical energy storage device of claim 44, wherein said conjugated compound includes a conjugated back-bone that is at least one compound selected from a first group consisting of a substituted or an unsubstituted homopolymer, copolymer or oligomer, said compounds of said first group having mer units selected from a second group consisting of phenylene vinylene, phenylene, fluorene, quinoline, quinoxaline, acetylene, aniline, phenylene-2,6-benzobisthiazole, phenylene-2,6-benzobisoxazole, phenylene-2,6-benzimidazole, arylene, and arylene vinylene, wherein said arylene is naphthalene, anthracene, furylene, thienylene, pyrrole, oxadiazole, selenylene or isothianaphthene.

47. The electrochemical energy storage device of claim 44, wherein conjugation in the conjugated compound extends for greater than or equal to 3 repeat units.

48. The electrochemical energy storage device of claim 44, wherein said side-chain includes at least one segment selected from the group consisting of methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene and derivatives of said segments of said group.

49. The electrochemical energy storage device of claim 44, wherein said polymer electrolyte includes at least one compound selected from a first group consisting of a polymer having a side group, a homopolymer, copolymer or a crosslinked network, said compound having mer units selected from a second group consisting of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives of said mer units of said second group.

50. The electrochemical energy storage device of claim 44, wherein said polymer electrolyte includes a polyelectrolyte and a counter ion, wherein said polyelectrolyte includes a polymer or copolymer having mer units selected from the group consisting of 2-sulfonethyl methacrylates, (diallydimethyl ammonium) chloride, styrene sulfonate, tetrafluoroethylene-{{2-(2-sulfonato-1,1,2,2-tetrafluoroethyloxy)-2-(trifluoromethyl-1,1,2-trifluoroethyloxy}-trifluoroethloxy} salts, (p-phenylene terephthalamide sulfonate) salts, oligo (ethylene oxide) methacrylate-co-methacrylate salt copolymer, methylene, ethylene, propylene, alkylene, acrylate, carbonate, styrene, ester, urethane, siloxane, phosphazene, amide, imide, itaconate, glutamate, p-phenylterephthalate, ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (0xyethylene) cyclotrisphosphazene, 2-(4-carboxyhexafluorobutanoyloxy) ethylmethacrylate and derivatives of said polymer or said copolymer of said group, and said counter ion is selected from the group consisting of lithium, sodium, potassium, rubidium, cesium, aluminum, cobalt, silver, barium, calcium, copper, zinc, manganese, magnesium, chromium, ammonium, tetramethyl ammonium, tetraethyl ammonium, tetrapropyl ammonium, tetrabutyl ammonium, tetradecyl ammonium, tribenzylphenyl ammonium, tetraphenyl ammonium, fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoroacetate, tetraphenylborate, toluene sulfonate, dodecylbenzene sulfonate, camphor sulfonate, picrate, salicylate, thiocyanate and benzoate.

51. The electrochemical energy storage device of claim 44, said polymer electrode further comprising a salt having cations and anions, said cations include at least one cation selected from the group consisting of lithium, sodium, potassium, rubidium, cesium, aluminum, cobalt, silver, barium, calcium, copper, zinc, mangan, magnesium, chromium, ammonium, tetramethyl ammonium, tetraethyl ammonium, tetrapropyl ammonium, tetrabutyl ammonium, tetradecyl ammonium, tribenzyl-phenyl ammonium, tetraphenyl ammonium, and said anions in said salt include at least one anion selected from the group consisting of fluorine, chlorine, bromine, iodine, perchlorate, bromate, nitrate, sulfate, phosphate, tetrafluoroborate, hexafluorophosphate, aluminum tetrachlorate, n-butyrate, trifluoromethane sulfonate, trifluoromethane sulfonamide, acetate, trifluoracetate, tetraphenylborate, toluene sulfonate, dodecylbenzene sulfonate, camphor sulfonate, picrate, salicylate, thiocyanate and benzoate.

* * * * *